3,032,411
METALLURGICAL PROCESS
Arthur F. Johnson, Boulder, Colo., assignor to Strategic Materials Corporation, Buffalo, N.Y., a corporation of New York
Filed Feb. 24, 1959, Ser. No. 795,244
16 Claims. (Cl. 75—74)

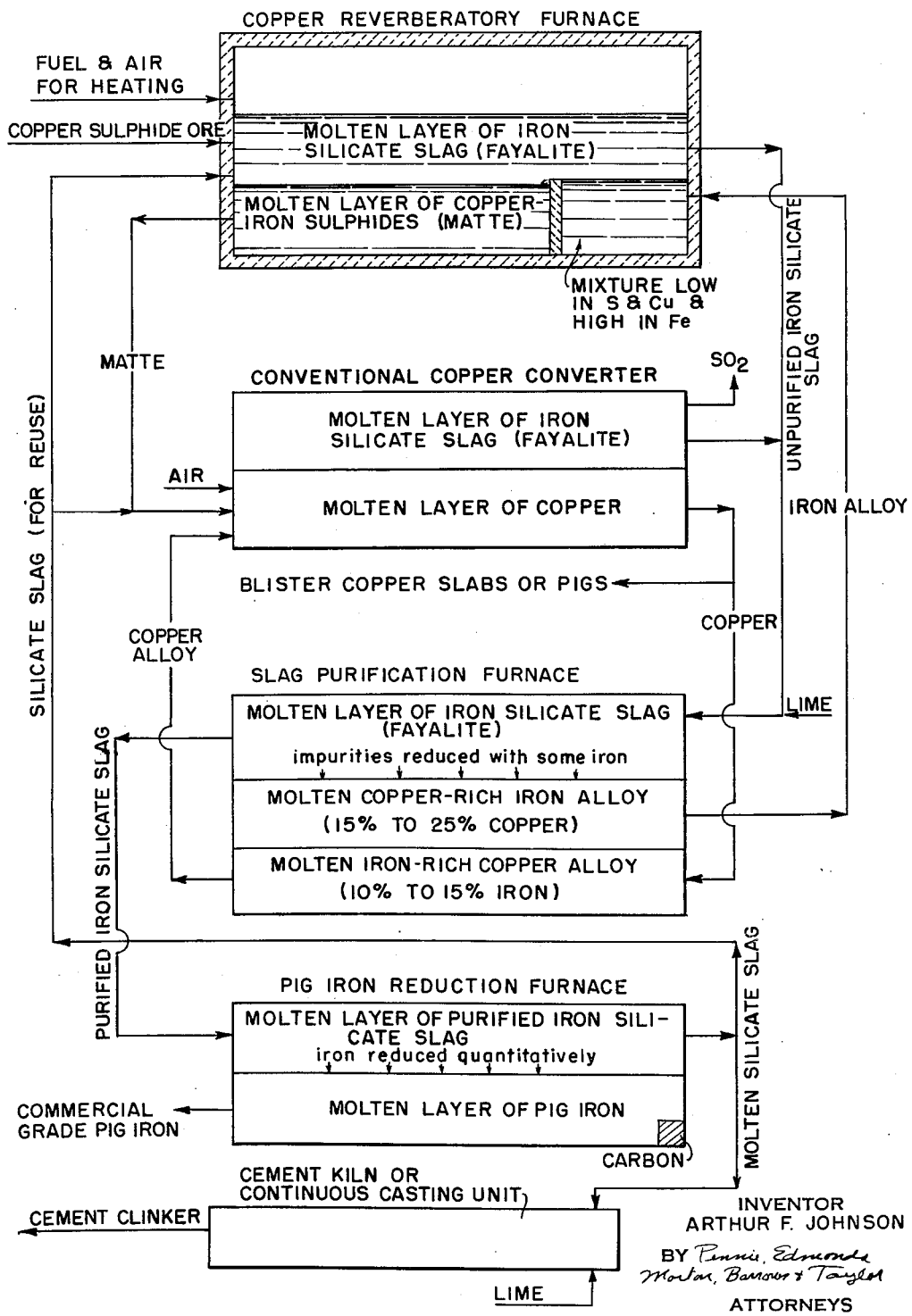

This invention relates to the treatment of the iron silicate slags (usually the fayalite type) and has for its object the provision of an improved process for recovering copper, the valuable precious metals, and the production of commercially valuable iron. In accordance with my invention, I subject the molten slag, preferably as it is removed from the copper reverberatory furnace or copper converter to save as much heat as possible, and subject it to a reducing treatment while in conntact with an underlying body of iron and copper alloy to purify the slag and recover the valuable metal components of the slag.

In the smelting of copper sulphide ores in reverberatory smelters and converters, iron silicate slags are commonly produced as waste products that contain high percentages of iron, often as much iron as the iron ore mined for iron production. Moreover, these slags are being discarded at about 2400° F., which is only a few hundred degrees below iron smelting temperatures. In the past many attempts have been made to recover iron economically from these slags, but the recovered iron has been so contaminated with impurities, that it has not constituted a commercially saleable grade of pig iron. In commercial pig iron currently made in conventional blast furnaces in the United States sulphur may run from 0.035% to 0.05%, phosphorus 0.035% in low phosphorous iron to 1.0% in Bessemer grade iron, while copper is generally less than 0.01% but may be acceptable a few points higher since average steel scrap may average 0.05% copper. The slags from copper reverberatory furnaces may run 1.0% or more in sulphur and 0.4% or more in copper and from 25% to 35% in iron; consequently when the sulphur and copper are reduced into the iron, the iron has little commercial value as pig iron.

I have discovered a process of purifying copper smelter slags, prior to the production of pig iron from these slags, so that the pig iron will meet commercial specifications. In my purification process I am able to prevent nearly all the sulphur, phosphorus, copper, gold and silver from entering the pig iron product and am able to recover the copper and precious metals in an alloy that may be returned to the copper smelter so as to increase the overall recovery of those elements from the iron silicate slags now being wasted.

My copending applications Serial No. 700,967, filed December 6, 1957, now abandoned; Serial No. 759,215, filed September 5, 1958, now Patent No. 2,986,458, granted May 30, 1961, and Serial No. 792,735, filed February 12, 1959, disclose methods whereby iron can be recovered from fayalite-type slags in unpurified or partially purified form by treatment in blast furnaces, open hearth furnaces or electric furnaces. The process of my present invention comprises the purification of molten iron silicate slag by contacting it in batches, or by continuous flow, with a molten bath or pool of iron and copper alloy wherein the impurities in the slag consisting of sulphur, phosphorus, copper, gold and silver are reduced from the slag into the molten bath together with some iron so that the purified slag upon subsequent quantitative reduction of its remaining iron content will yield a pig iron of commercial specification grade. I have discovered that an iron alloy bath containing about 15% to 25% of copper or more removes sulphur, gold, and silver from the fayalite slag better than a bath of molten iron free of copper. Likewise I have discovered a more surprising phenomenon that copper itself is likewise removed more readily and completely from fayalite-type slags when there is some copper alloyed with the iron bath contacting the slag. By maintaining the alloy pool at least several inches deep in a suitable processing furnace and by supplying it with appropriate amounts of copper; the pool separates into two more or less immiscible layers; the upper of which is an iron alloy containing about 15% to 25% copper, and the lower of which is a copper alloy containing about 9% to 15% iron. I can decrease the amount of copper in the iron pool and the amount of iron in the copper pool as well as increase the immiscibility of the two pools one above the other by increasing the operating temperature from a lower range of about 2640° F. to an upper range of about 2870° F. Likewise, I find that the same alloy contents can be decreased and the immiscibility of the two layers increased and the reducing action of the alloys upon the slag increased by controlled additions of carbon to the iron layer. However, carbon as an alloy constituent strongly tends to prevent the absorption of sulphur by the alloys so that when sulphur is to be absorbed, I limit the content of carbon in the iron layer to 1.0% and preferably keep it less than 0.1%. Likewise, silicon and aluminum in the alloy layers prevent sulphur assimilation from the slag and I avoid these.

It appears that the continuous reduction of iron into the iron alloy layer occasioned by the presence of some carbon as an alloying agent serves to collect the copper, gold and silver much the same as an assay fusion tends to collect the precious metals where lead is the molten collecting agent. In any case, I find that it is necessary to preserve a reducing atmosphere above the surface of the slag as it flows over the iron and copper alloy bath in order that copper be quantitatively reduced from the slag; and I accomplish this by floating some carbonaceous matter on the slag or the use of a reducing gas above the surface of the slag or both. If an oxidizing atmosphere is maintained, copper will leave the copper and iron alloy and enter the slag.

The sulphur and other impurities accumulated in the copper alloy pool may be disposed of by periodically transferring some of the copper alloy to the copper converter furnace while the sulphur is blown out by air as sulphur dioxide and the gold and silver enter the resulting blister copper slabs cast for subsequent electrolytic purification by conventional metallurgical processes. The amount of copper removed in such transfer as well as that needed to maintain alloy pools at least several inches in depth is obtained from copper from the copper converter or elsewhere.

The iron alloy with its impurities such as phosphorus may be transferred to the copper converter for disposal; but I find that an additional purifying action upon the fayalite-slag may be effected by transferring the iron alloy to the reverberatory furnace, and into a separate compartment of the reverberatory furnace located near the fayalite-slag outlet end of the furnace. This outlet end of the copper reverberatory smelting furnace is usually located opposite to the firing end where the bulk of the copper ores or copper concentrates are fed to the furnace for melting such into matte (copper-iron sulphide) and fayalite-slag. Conventional copper reverberatory smelting furnaces may be about 20 ft. wide by 100 ft. or more long (inside dimensions).

In one aspect of my invention about 10% or more of the end of the furnace nearest the slag tap hole may be made into a compartment by a raised division across the bottom of the furnace just high enough to keep the iron-copper-sulphur mixtures in the 10% length separate from the copper-iron-sulphur mixtures in the 90% length while at the same time forming a weir over which the fayalite-slag flows on its way to the slag tap hole. From time to time as I add iron alloy at about 2870° F. (containing 15% or less of copper) to the small compartment, the contents of that compartment will average less in copper content than the percentage carried in the 90% length of the furnace which usually averages 22% to 43% copper in conventional practice. Likewise by adding iron alloy to the small compartment the average sulphur content therein is reduced below the 22% to 26% prevailing in conventional reverberatory mattes. By the law of mass action the fayalite-slag flowing over the small compartment tends to give up its copper and other impurities. To enhance the purifying action on the slag, matte removed from the reverberatory furnace to the converter is always withdrawn from the large compartment so that when iron alloy is added to the small compartment the matte in this compartment tends to overflow the weir (countercurrent to the slag) and enters the large compartment. Such matte overflowing the weir will be much richer in sulphur and copper than the iron alloy on which it floats. The iron alloy averages only a few percent in sulphur. If desired, iron pyrites containing little if any copper may be added to the small compartment to supplement the action of keeping this compartment low in copper, but this is not my preferred practice. In order to effectively reduce the copper from the fayalite-slag, I find it necessary to keep the slag surface over the small compartment under a reducing condition by floating carbonaceous material thereon or by a reducing gas playing on the slag surface or both.

The reverberatory copper smelting furnace may also be further compartmented to contain the copper and iron alloy pools used in ultimate slag purification of sulphur, phosphorous gold and silver; but instead, I prefer to house such copper and iron alloy pools in a furnace substantially free of sulphurous fumes which may conveniently be a compartment in the furnace used to quantitatively reduce iron from slag. This may be an electric furnace or open hearth reverberatory furnace similar to those described in my aforementioned copending patent applications. The hot gases fom these furnaces may advantageously be used to supplement the heat needed in copper reverberatory smelting furnaces.

I find that copper is more quantitatively reduced from the slag if some lime is added to the slag after it has received a partial purification in the small compartment of the reverberatory copper smelting furnace. If no lime were added, the silica ($SiO_2$) in the slag after subsequent complete iron reduction might run as high as 70% and be too viscous to flow at steel making temperatures. Where a commercial grade of pig iron or steel is to be made from a fayalite-type of slag, I usually add enough lime to the slag so that the ratio of CaO plus MgO to $SiO_2$ plus $Al_2O_3$ is 0.70 to 1.10 or higher; but not as high as 1.50 since the slag must be extremely hot to dissolve this much lime. It is wasteful of heat and unnecessarily increases the consumption of lime needed to produce commercial grade iron and steel. Other fluxes such as dolomite, fluorspar or bauxite may be added to the slag to reduce its viscosity, but lime is generally to be preferred as the resulting calcium silicate slag after being entirely stripped of iron is so pure as to be sutiable for the manufacture of white cement. Likewise these slags are suitable for the manufacture of Portland slag cement by the method revealed in my copending patent application Serial No. 792,735, filed February 12, 1959, or also Portland cement by blowing the molten slag into a cement kiln with additional lime (and other constituents as needed). In order to make very white cement which contains less than 0.5% iron, I grind the cement clinker formed in the cement kiln or continuous casting machine and magnetically remove the fine particles of iron which are ordinarily entrained in the slag and so enter the clinker. Such white cement has a market value of about three times that of an equal weight of Portland cement although the quantity demand of the market is much smaller than for Portland cement.

My invention may be utilized solely as a method for increasing the recovery of copper and precious metals from a copper smelter without any by-product iron being recovered or by-product cement being produced. It may be used to quantitatively remove copper and the precious metals from copper smelter slags and thereafter quantitatively recover iron of commercial grade from such purified slags while producing a calcium silicate slag suitable for manufacture into Portland cement or white cement.

The accompanying drawing is a flow sheet illustrating diagrammatically an arrangement of apparatus and a series of operations for carrying out a process of my invention.

The following example illustrates the removal of impurities from a copper reverberatory smelter slag of the following composition:

| | Percent |
|---|---|
| FeO | 44.4 |
| $SiO_2$ | 38.5 |
| CaO | 6.9 |
| $Al_2O_3$ | 4.6 |
| S | 1.0 |
| Zn | 0.77 |
| MgO | 1.9 |
| CuO | 0.38 |
| Pb | 0.18 |
| As | 0.15 |
| Mn | 0.25 |

Such slag in the molten condition was contacted under reducing atmosphere with a copper pool of electrolytic purity, the copper comprising about 6.2% of the weight of the slag treated. After about 20 minutes contact at approximately 2600° to 2900° F. enough iron has been reduced from the slag so that the iron alloy composite averaged 1.65% sulphur, 0.39% phosphorus and 23.1% copper. Thereafter, the purified slag was contacted with a pool of molten iron of the following analyses after the addition of lime to the amount of about 36.4% of the original weight of the slag:

| | Percent |
|---|---|
| C | 2.50 |
| Si | 3.00 |
| P | 0.75 |
| S | 0.07 |

This pool of molten iron constituted about 30.5% of the original weight of the slag. It was kept in contact with carbonaceous material of low sulphur content.

The iron from the slag was quantitatively reduced into the molten iron pool at about 2700° to 3000° F. and the calcium silicate slag exerted a purifying action on the iron so that after one hour contact the resultant iron analyzed as follows:

| | Percent |
|---|---|
| C | 3.58 |
| Si | 2.27 |
| P | 0.45 |
| S | 0.032 |
| Cu | 0.014 |

The calcium silicate slag, after magnetically separating the iron therefrom contained only 0.65% iron so was suitable with the addition of low-iron lime for the production of white cement containing less than 0.5% iron, and with appropriate additions could be made into Portland slag cement or with appropriate additions and kiln firing could be made into Portland cement.

The above example shows that copper and sulphur were quantitatively removed in the purifying step and phosphorus partially removed so that the resulting pig iron is of commercial Bessemer grade.

According to the invention it is advantageous to return the purified slags from which iron has been reduced to smelting plants for reuse on account of their renewed solvent action for phosphorus, sulphur and iron. The fact that the slags are already molten is highly advantageous in speeding the time of smelting, as well as saving fuel in smelting. In preparing copper sulphide concentrates for smelting, these may be highly beneficiated very cheaply by grinding followed by flotation to rid the sulphides of all possible removable silica and the siliceous flux needed for smelting mostly provided by the continued reuse of slag after purifying it of copper, sulphur and phosphorus and then stripping the slag of all or just a part of its contained iron.

Due to the economy in heat effected as well as the shorter smelting time when hot slag is reused it becomes practical to smelt iron sulphide concentrates for their iron content although minor amounts of copper and precious metals present may likewise be recovered by my process steps outlined above.

It likewise becomes possible to reuse blast furnace slags and open hearth furnace slags in iron ore reduction since such slags may be similarly cheaply purified of their sulphur and phosphorous content and thus their solvent ability for these elements renewed.

In non-ferrous sulphide smelting processes using iron silicate slags for fluxing, it is not necessary that the flux added to the ore or concentrate in smelting be pure silica, but the slag may contain some iron silicate as well as various amounts of calcium, magnesium or aluminum. I find it possible to reduce impure iron alloy from such slags by contacting them while molten with a copper or copper and iron alloy pool. The iron copper alloy used as a reducing pool in this process may have its reducing action intensified by the addition of carbon up to 3% or more, and the presence of this carbon in the iron rich layer decreases the solubility of copper in the iron rich layer so that iron may be drawn off with a copper content of only 12% or less and the copper content further reduced by liquation. Such crude iron alloy containing several percent of sulphur has limited special uses when in granular or powder form such as reducing copper from copper sulphate solutions to produce cement copper.

I claim:

1. A process for the extraction of copper, sulphur, phosphorus and the precious metals from copper, smelter iron silicate slags which comprises contacting the molten slag to be purified with a molten metallic bath consisting principally of an alloy comprising approximately 15% to 80% of iron, less than 1% carbon, and the remainder of copper while keeping the slag surface under a reducing condition, from time to time removing the accumulating iron and copper alloys with alloyed precious metals and sulphur and phosphorus, and adding the removed alloy to a copper reverberatory smelting operation.

2. The process of claim 1 in which the molten metallic bath is maintained by appropriate copper additions one inch or more in depth in a slag purification furnace so that the metallic bath will separate into an iron alloy above and a copper alloy below, said alloys being somewhat immiscible one in the other.

3. The process of claim 2 in which the iron alloy layer is alloyed with a controlled amount of carbon, in an amount varying from less than 0.1% to 1.0%.

4. The process of claim 2 in which the iron alloy layer is drawn off from time to time as iron and impurities are reduced from the slag and added to the end of a copper reverberatory furnace near the slag tap hole with the result that the copper-iron-sulphur mixture in such end of the copper reverberatory furnace is lower in sulphur and copper than the matte in the remainder of the copper reverberatory furnace.

5. The process of claim 1 in which the reducing atmosphere is maintained by a reducing agent of the group consisting of a reducing gas and floating carbonaceous material on the surface of the slag.

6. The process of claim 1 in which lime is added to the iron silicate slag at least prior to the purification treatment.

7. The process of treating an iron silicate slag from a copper smelting operation containing iron oxide, silica, sulphur, phosphorus, and precious metals which comprises subjecting the slag to reducing conditions while overlying a molten metallic bath comprising approximately 15% to 80% of iron, less than 1% carbon, and the remainder of copper and reducing into the alloy bath some iron, copper, sulphur, phosphorus and precious metals leaving a purified iron silicate slag, separating the purified slag from the alloy bath and subjecting it to reduction for the reduction of the iron oxide and the production of a commercial grade of iron, said iron having less than 0.06% of sulphur, less than 1.0% of phosphorus and less than 0.06% of copper.

8. In the process of claim 7, effecting a substantially quantitative reduction of the iron oxide and adding lime to the resulting high silicate slag to form a Portland-slag cement suitable for conversion to white cement.

9. In the process of claim 7, returning the purified iron-silicate slag to the copper smelting operation.

10. In the process of claim 7 passing the purified slag to a process for the beneficiating of copper sulphides ore to compensate for lack of siliceous flux in the subsequent smelting of said ore.

11. In the process of claim 7, passing the high silicate slag after the reduction of iron oxide to a copper smelting operation.

12. In the process of claim 7, treating the slag from the copper smelting operation while molten, and passing the silicate slag after the reduction of the iron oxide while molten to the copper smelting operation.

13. The process of reducing iron from an iron silicate slag in a molten state which comprises applying the slag over a bath of iron-copper-carbon alloy and reducing at least a part of the iron oxide of the slag.

14. In the process of claim 12 reducing a sufficient amount of iron and providing a sufficient amount of copper to form two iron and copper alloys of different iron and copper ratios which form in two immiscible layers beneath the slag.

15. In the process of claim 13, drawing separate portions of the alloy from the two immiscible layers.

16. The improvement in the operation of a copper reverberatory smelting furnace having a charge entrance at one end and a slag tap hole at another end which comprises, maintaining a pool of low-sulfur, low-copper iron alloy beneath the slag in said furnace near the slag tap hole, said pool having a volume of approximately one-tenth of the total metallic volume of the remainder of the furnace and being separated therefrom, further maintaining a reducing atmosphere over the slag overlying said metallic pool, said pool acting to reduce copper and other impurities from said slag into a matte, and adjusting the level of said pool so as to force matte thus formed into the remaining portion of said furnace for tapping and transfer to a copper converter.

(References on following page)

References Cited in the file of this patent

UNITED STATES PATENTS

| | | |
|---|---|---|
| 417,314 | Devereux | Dec. 17, 1889 |
| 578,817 | Grant | Mar. 16, 1897 |
| 589,210 | Hall | Aug. 31, 1897 |
| 766,656 | Baggaley et al. | Aug. 2, 1904 |
| 1,544,048 | Stout | June 30, 1925 |
| 2,403,419 | Wilkens et al. | July 2, 1946 |
| 2,809,028 | Kinney et al. | Oct. 8, 1957 |

FOREIGN PATENTS

| | | |
|---|---|---|
| 3,972 | Great Britain | of 1882 |
| 117,470 | Great Britain | July 15, 1918 |
| 15,107 | Australia | Nov. 9, 1933 |

OTHER REFERENCES

Constitution of Binary Alloys, 2nd Ed., page 581. Edited by Hansen. Published in 1958 by the McGraw-Hill Book Co., New York.